US011282508B2

(12) United States Patent
Qu et al.

(10) Patent No.: US 11,282,508 B2
(45) Date of Patent: Mar. 22, 2022

(54) SYSTEM AND A METHOD FOR SPEECH ANALYSIS

(71) Applicant: Blue Planet Training, Inc., Montclair, NJ (US)

(72) Inventors: Huamin Qu, Kowloon (HK); Yuanzhe Chen, Kowloon (HK); Siwei Fu, Kowloon (HK); Linping Yuan, Kowloon (HK); Aoyu Wu, Kowloon (HK)

(73) Assignee: Blue Planet Training, Inc., Montclair, NJ (US)

(*) Notice: Subject to any disclaimer, the term of this patent is extended or adjusted under 35 U.S.C. 154(b) by 205 days.

(21) Appl. No.: 16/707,073

(22) Filed: Dec. 9, 2019

(65) Prior Publication Data
US 2020/0273450 A1 Aug. 27, 2020

Related U.S. Application Data

(60) Provisional application No. 62/808,372, filed on Feb. 21, 2019.

(51) Int. Cl.
*G10L 15/02* (2006.01)
*G10L 15/04* (2013.01)
*G10L 15/22* (2006.01)
*G10L 15/18* (2013.01)

(52) U.S. Cl.
CPC .......... *G10L 15/1807* (2013.01); *G10L 15/02* (2013.01); *G10L 15/04* (2013.01); *G10L 15/22* (2013.01)

(58) Field of Classification Search
CPC ..... G10L 14/1807; G10L 15/02; G10L 15/04; G06G 3/16; G06G 40/00; G10I 15/1807; G10I 15/02; G10I 15/04
See application file for complete search history.

(56) References Cited

U.S. PATENT DOCUMENTS

| 7,398,274 B2* | 7/2008 | Ittycheriah .......... G10L 15/1822 |
| 2010/0161327 A1* | 6/2010 | Chandra ................. G10L 17/02 704/235 |
| 2016/0093289 A1* | 3/2016 | Pollet .................... G10L 13/027 704/260 |

(Continued)

OTHER PUBLICATIONS

"Jonathan G. Fiscus, Multiple Dimension Levenshtein Edit Distance Calculations for Evaluating Automatic Speech Recognition Systems During Simultaneous Speech, Jan. 2006, National Institute of Standards and Technology (NIST)" (Year: 2006).*

(Continued)

*Primary Examiner* — Sonia L Gay

(57) ABSTRACT

A computer implemented method and system for processing an audio signal. The method includes the steps of extracting prosodic features from the audio signal, aligning the extracted prosodic features with a script derived from or associated with the audio signal, and segmenting the script with the aligned extracted prosodic features into structural blocks of a first type. The method may further include determining a distance measure between a structural block of a first type derived from the script with another structural block of the first type using, for example, the Damerau-Levenshtein distance.

8 Claims, 11 Drawing Sheets

(56) References Cited

U.S. PATENT DOCUMENTS

2017/0278179 A1* 9/2017 Perrier .................... G06F 3/165

OTHER PUBLICATIONS

ROC Speak: Semi-Automated Personalized Feedback on Nonverbal Behavior from Videos; Michelle Fung et al.; ROS-HCI; Univ. Rochester, NY.
Text Visualization of Song Lyrics; Jieun Oh; Center for Computer Research in Music; Stnford Univ.
Prosograph: A Tool for Prosody Visualization of Large Speech Corpora; Alp Oktem et al.; Interspeech 2017, Stockholm, Sweden.
ReadN' Karaoke: Visualizing Prosody in Childern's Books for Expressive Oral Reading; Rupal Patel and Wm. Furr; CHI 2011, Vancouver BC.
Capture-Time Feedback for REcording Scripted Narration; Steve Rubin et al.; UIST 15; Nov. 2015; Charlotte, NC.

* cited by examiner

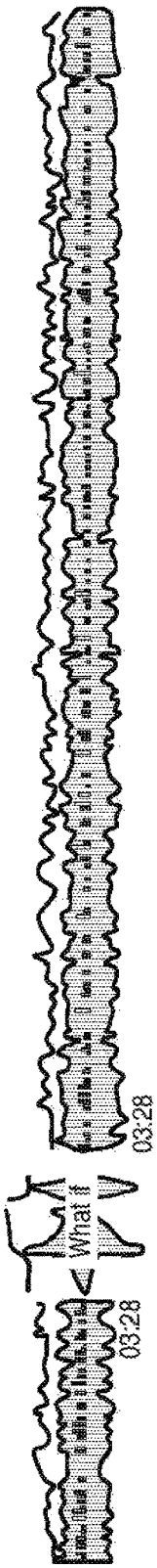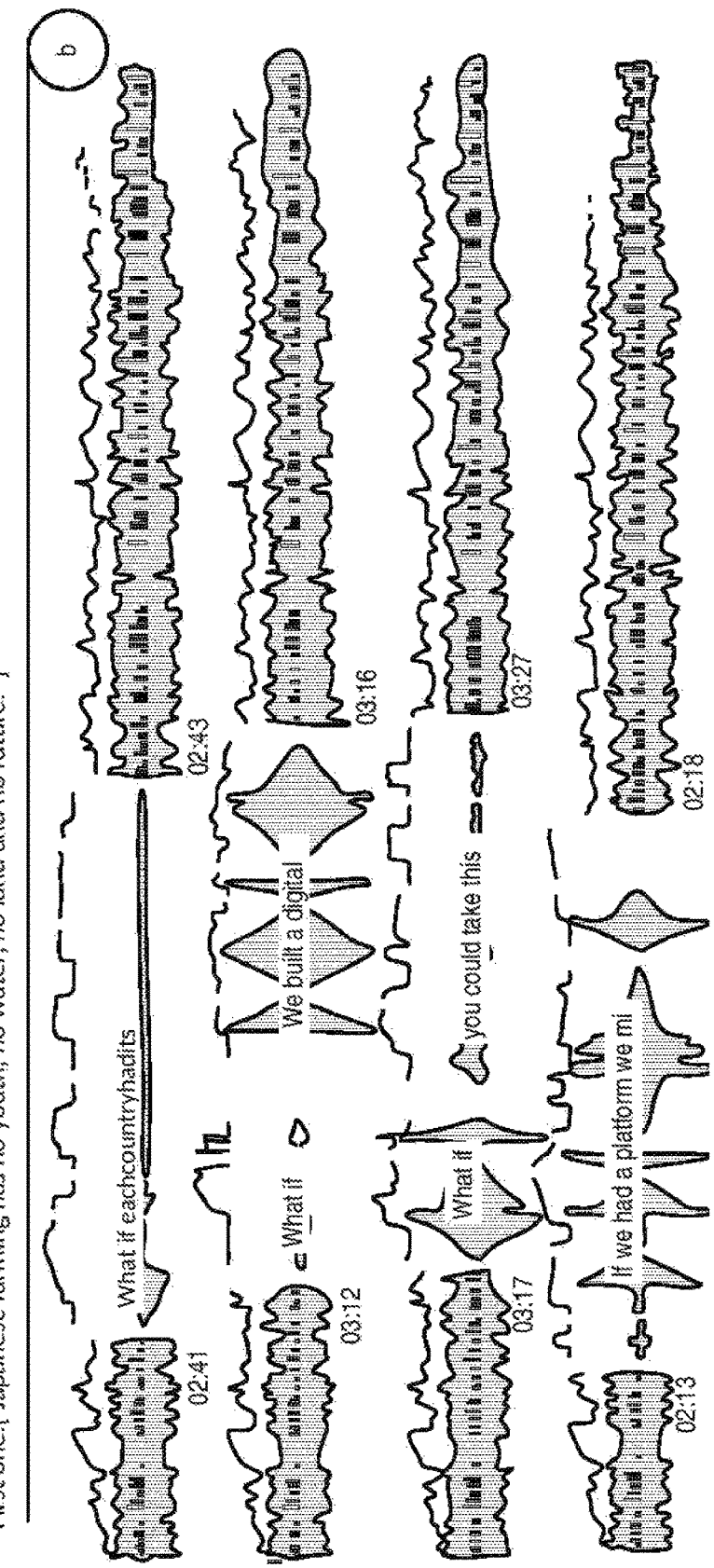
Fig. 10

SYSTEM AND A METHOD FOR SPEECH ANALYSIS

PRIORITY CLAIM

This utility patent application claims priority to U.S. provisional patent application Ser. No. 62/808,372, filed 2019 Feb. 21, which is incorporated herein by reference for all purposes.

FIELD OF THE INVENTION

The invention relates to a system and a method for processing an audio signal and, more particularly, to a system and method for analyzing and/or visualizing audio speech clips.

BACKGROUND OF THE INVENTION

While delivering public speech becomes increasingly important, it remains a challenging task for most people since it requires various skills. One of the major challenges is the difficulty, especially for non-native speakers, to produce an effective and captivating narration of the speech, which has been shown to have an important impact over audience engagement level.

A good narration requires speakers to use proper prosody, that is, the melody of speech including pitch, intensity, speed rate, pause etc., to deliver information expressively. Many systems have been proposed in recent years to help speakers analyze their narration performance. Some work aims at providing instant feedback to speakers during rehearsal, and others summarize a speaker's performance such as voice modulation to support self-reflection. Recently, certain systems were proposed to modify speakers' recordings by re-synthesis technology that allows speakers to hear how they can speak better. Although these systems successfully promote speakers' awareness of their voice status in the presentation, they also have limitations. First, some work requires speakers to repeatedly listen to their recordings and to improved ones, which is inefficient and easily makes users feel frustrated. Secondly, since a good speech can be delivered with various styles, it is better to allow users to explore and customize the narration style they want to imitate.

The past few years have witnessed more and more digitalized speech data such as, for example, TED Talks, which provide rich samples of good narration strategies. While many people consider these as references to better speech narration, it is challenging to identify specific samples of desired narration strategies. First, TED Talks comprises a large-scale dataset with, at present, in excess of 2,900 talks, which makes it extremely difficult, if not impractical, for people to readily search for a suitable sample by watching all the talks. Second, it is still difficult to notice useful strategies even if they only focus on one talk, because they might be overwhelmed by thousands of words being spoken at a high speed.

A public speaking exploration system using a data-driven approach is therefore desired. To achieve this, it is advantageous to provide an improved audio signal processing system and method.

OBJECTS OF THE INVENTION

An object of the invention is to mitigate or obviate to some degree one or more problems associated with known public speaking exploration systems and/or known audio signal processing systems.

The above object is met by the combination of features of the main claims; the sub-claims disclose further advantageous embodiments of the invention.

Another object of the invention is to provide a data-driven public speaking exploration system.

Another object of the invention is to provide an improved method of analyzing and/or processing an audio signal with an associated script.

Yet another object of the invention is to provide an improved method of visualizing an audio signal with an associated script.

One skilled in the art will derive from the following description other objects of the invention. Therefore, the foregoing statements of object are not exhaustive and serve merely to illustrate some of the many objects of the present invention.

SUMMARY OF THE INVENTION

The invention generally relates to a visual analytics system that allows users to understand good prosodic patterns in high-quality speech samples, and thus to discover good narration strategies. In one embodiment, the invention first extracts the prosodic features of each speech and aligns these features with the script. Then, a three-level hierarchy, i.e., speech-level, sentence-level and word-level, is preferably constructed and visually presented. The system may consist of four linked views and rich interactions to facilitate this three-level-of-detail analysis.

In a first main aspect, the invention provides a computer implemented method of processing an audio signal, comprising the steps of: extracting prosodic features from the audio signal; aligning the extracted prosodic features with a script derived from or associated with the audio signal; and segmenting the script with said aligned extracted prosodic features into structural blocks of a first type. Preferably, the audio signal comprises a digital audio clip of a human speech, but may comprise synthesized speech, e.g. a speech generated from a text by a computer synthesizer application.

Preferably, the audio signal comprises digital audio clip of a human speech or a digital audio clip of a computer synthesized speech generated from a text.

Preferably, the segmenting step simultaneously segments the script and the aligned extracted prosodic features into structural blocks of a first type. The segmented structural blocks of a first type of the script may comprise any one or any combination of clauses, phrases or sentences comprising the script.

Preferably, the prosodic features are extracted from the audio signal to form a time series with a predefined, selected or calculated sample rate. After aligning the extracted prosodic features with a script derived from or associated with the audio signal, each structural block of a second type comprising the script may be labelled with one or both of a start timestamp and an end timestamp. The structural blocks of a second type comprising the script may comprise any one or any combination of unigrams, bigrams and trigrams.

Preferably, the method further comprises the step of: determining a distance measure between a structural block of the first type derived from the script with another structural block of the first type. The other structural block of the first type may be derived from a source other than the script.

Preferably, the distance measure comprises a measure of similarity between the structural block of the first type derived from the script and the other structural block of the first type.

The method may further comprise the steps of: for each of the structural block of the first type derived from the script and the other structural block of the first type, extracting part-of-speech (POS) tags for each structural block of a second type comprising said structural block of the first type to form a POS sequence; and calculating an edit distance between the POS for the structural block of the first type derived from the script and the POS for the other structural block of the first type. The edit distance between the POS for the structural block of the first type derived from the script and the POS for the other structural block of the first type may be calculated using the Damerau-Levenshtein distance.

The measure of similarity between the structural block of the first type derived from the script and the other structural block of the first type may be determined from the equation:

$$CSS(S_1,S_2)=\min \Sigma \|edits(CS_{S_1}, CS_{S_2}))\|$$

where $CS_{S1}$ and $CS_{S2}$ respectively comprise the structural block of the first type derived from the script and the other structural block of the first type and where $CSS(S_1,S_2)$ is the calculated measure of similarity.

In a second main aspect, the invention provides a system comprising: a signal analysis module for extracting prosodic features from the audio signal; a signal alignment module for aligning the extracted prosodic features with a script derived from or associated with the audio signal; and a script segmenting module for segmenting the script with the extracted prosodic features into structural blocks of a first type. Preferably, the signal analysis module comprises a speech synthesis or speech analysis module, the signal alignment module comprises a speech to text alignment module, and the script segmenting module comprises a human language analysis module.

In a third main aspect, the invention provides a non-transitory computer readable medium storing machine-readable instructions executable by a processor to configure a signal processing system to perform the method of the first main aspect of the invention.

In a fourth main aspect, the invention provides a computer implemented method of searching a speech dataset, the method comprising the steps of: receiving a user input comprising a structural block of a first type from a script comprising a part of the speech dataset; extracting part-of-speech (POS) tags for each structural block of a second type comprising said inputted structural block of the first type to form a POS sequence for said inputted structural block of the first type; and comparing said extracted POS sequence for said inputted structural block of the first type with POS sequences for structural blocks of the first type in the speech dataset to thereby identify one or more other structural blocks of the first type in the speech dataset which have a same or similar POS as the inputted structural block of the first type.

Preferably, the step of identifying one or more other structural blocks of the first type in the speech dataset which have a same or similar POS as the inputted structural block of the first type identifies their associated scripts or speeches. One or more of the identified associated scripts or speeches may be made available to a speech replay or speech synthesis module or system to audio play all of part of said associated scripts or speeches to a user.

Preferably, the step of comparing said extracted POS sequence for said inputted structural block of the first type with POS sequences for structural blocks of the first type comprises determining a distance measure between the inputted structural block of a first type and each of the one or more other structural blocks of the first type in the speech dataset. The distance measure may comprise a measure of similarity between the inputted structural block of the first type and each of the one or more other structural blocks of the first type in the speech dataset.

The method may further comprise the step of calculating an edit distance between the POS for the inputted structural block of the first type and each of the one or more other structural blocks of the first type in the speech dataset. The edit distance between the POS for the inputted structural block of the first type and each of the one or more other structural blocks of the first type in the speech dataset may be calculated using the Damerau-Levenshtein distance.

The measure of similarity between the inputted structural block of the first type and each of the one or more other structural blocks of the first type in the speech dataset may be determined from the equation:

$$CSS(S_1,S_2)=\min \Sigma \|edits(CS_{S_1}, CS_{S_2}))\|$$

where $CS_{S1}$ and $CS_{S2}$ respectively comprise the inputted structural block of the first type derived from the script and each of the one or more other structural blocks of the first type in the speech dataset and where $CSS(S_1,S_2)$ is the calculated measure of similarity.

In a fifth main aspect, the invention provides a system for searching a speech dataset, the system comprising: a processor configured to: receive a user input comprising a structural block of a first type from a script comprising a part of the speech dataset; extract part-of-speech (POS) tags for each structural block of a second type comprising said inputted structural block of the first type to form a POS sequence for said inputted structural block of the first type; and compare said extracted POS sequence for said inputted structural block of the first type with POS sequences for structural blocks of the first type in the speech dataset to thereby identify one or more other structural blocks of the first type in the speech dataset which have a same or similar POS as the inputted structural block of the first type.

In a sixth main aspect, the invention provides a non-transitory computer readable medium storing machine-readable instructions executable by a processor to configure a signal processing system to perform the method of the third main aspect of the invention.

BRIEF DESCRIPTION OF THE DRAWINGS

The foregoing and further features of the present invention will be apparent from the following description of preferred embodiments which are provided by way of example only in connection with the accompanying figures, of which:

FIG. 10 illustrates user querying of a sentence in the timeline of the user interface for the signal processing system of FIG. 1.

DESCRIPTION OF PREFERRED EMBODIMENTS

Figure 1:
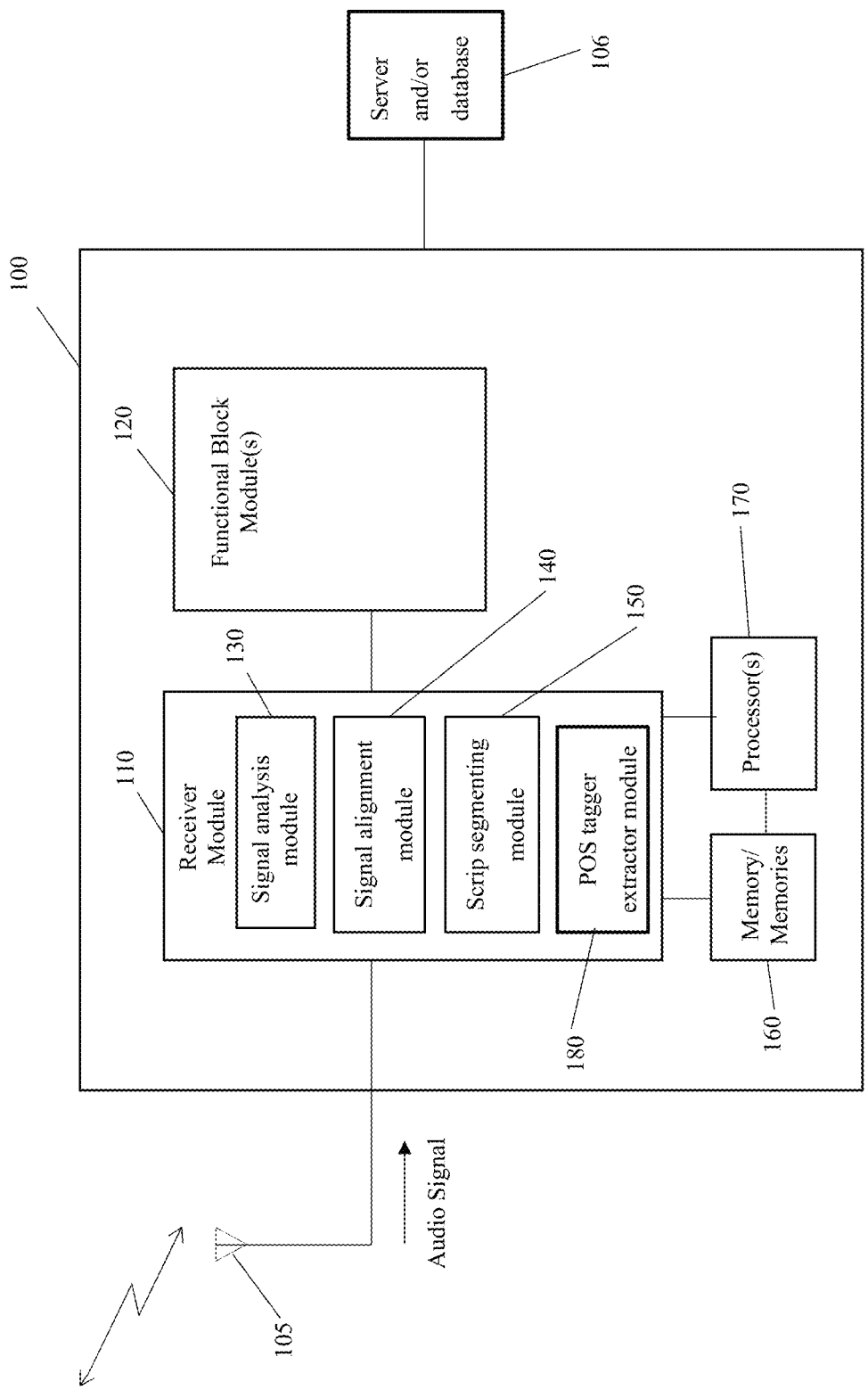
FIG. 1 is a block schematic diagram of a signal processing system in accordance with the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

There is already a large variety of prosodic feature visualization techniques. The most common method is using line charts to encode different feature values along a horizontal time axis, for example, by extending the traditional line chart by encoding different feature values as different visual cues of a line chart such as height, background color and graph color. Instead of mapping features to those channels, some other systems are adapted to generate thumbnail images representing acoustic features by optimizing top-down visual criteria.

Within the scope of understanding prosodic patterns in speech analysis, it is often necessary to associate prosodic features with scripts. Several systems have been presented to embed prosodic features into script visualization. The most straightforward way to embed prosodic features is drawing a line/bar chart along the script or overlaying a heatmap on the script. For example, two visualization schemes for multiple prosodic features have been disclosed. One is to manipulate text directly and the other is to augment scripts with overlaid text rendering techniques. Other systems further add vertical sparklines with summarized musical features to show the overall structure of songs.

Although these methods can reveal prosodic patterns in public speech, it is tedious for users to explore the whole large-scale dataset. The present invention features an overview component, which summarizes prosodic features of each speech, allowing users to effectively identify speeches with desired narration style. Moreover, the present invention's 'focus and context' design scales better when analyzing and comparing speech-level prosodic features.

Many automated systems have recently been developed to analyze speakers' narration status. Some work generates feedback on various factors by automatically analyzing a user-recorded speech, for example, by providing users with feedback about voice volume and phonetics pauses; or utilizing the basic f0 contour to present voice pitch and teach speakers to use proper intonation in discourse. Recently, it is proposed to not only provide feedback to users about their narrations, but also generate an improved version by re-synthesizing the original audio, which iteratively improves users' narrations by informing them of their weaknesses. A system has been developed which enables users to explore presentation techniques in TED Talks. Some work provides real-time feedback with the help of extra devices, for example, by generating visual summaries from a user recorded video, and the latter system also provides comments from the audience. It is also known to use a Google Glass device to inform speakers of their speed rate and volume, or to use a detachable wristband which can be used to increase a speaker's awareness of their voice pitch, words per minute and filler words.

Since there is no standard to measure the quality of narration, all the above-mentioned approaches either provide feedback based on heuristics, e.g., do not speak too fast or too low, or define high-quality narration based on users' annotation.

The present invention provides a system to tackle this problem from a data-driven perspective, that is, to provide a visual analytic system to explore and imitate high-quality public speeches. The system allows users to identify speech samples according to their desired narration style and understand the characteristics of those good samples, and therefore apply the strategy into their narrations. To verify this method, case studies using TED Talks data and collected feedback from domain experts were conducted.

First, however, it is necessary to process/analyze audio speech clips as will be described in greater detail below.

The system of the present invention aims to help speakers explore a large-scale speech dataset and identify good speech samples with meaningful narration strategies. To inform the design of the analysis and visualization system, two questions need to be answered: 1) What prosodic features are insightful for users? 2) How to guide users to useful speech and interpretatively present these prosodic features? To answer these questions, potential prosodic features were first collected based on a comprehensive literature review. Then, a user-centered design process was followed in collaboration with three domain experts to understand user requirements. All the experts have been engaged in English teaching in universities, and one of the experts has taught a presentation skill course for over 10 years. Based on the literature review and the interviews with experts, the requirements of the system are summarized as:

Prosodic Features. In linguistics, prosody is concerned with those elements of speech that are not individual phonetic segments (vowels and consonants) but are properties of syllables and larger units of speech, including linguistic functions such as intonation, tone, stress and rhythm, among others. Such elements are known as supra-segmentals.

Prosody may reflect various features of the speaker or the utterance: the emotional state of the speaker; the form of the utterance (statement, question, or command); the presence of irony or sarcasm, emphasis, contrast, and focus. It may otherwise reflect other elements of language that may not be encoded by grammar or by choice of vocabulary.

Among various prosodic features, pitch, volume, and pause may be selectively identified as these are consistently considered as important factors that affect speakers' narration quality:

Pitch. The change of pitch value can be used to express the intonation, which is one of the most important prosodic features. Different intonation can deliver different messages. If a speaker uses a small variation of intonation, the resulting speech may sound robotic and the audience can lose focus.

Volume. The variation of volume can help to create various effects during narration. For example, peaks of the volume value are usually used to emphasize a specific word.

Pause. A proper pause can help hint to the audience that the speaker is about to make an important point, allow the audience to digest previous speech, or simply act as a signal of transition. To the contrary, an unnecessary and unintentional pause may disrupt a sentence.

However, the invention is not limited to only the prosodic features of pitch, volume and pause, but may include other prosodic features such as stress, tempo, rhythm and chunking. Stress, or emphasis, is easy to use and recognize in spoken language, but harder to describe. A stressed word or syllable is usually preceded by a very slight pause, and is spoken at slightly increased volume. Chunking is where an often-spoken familiar group of words is delivered almost as a single word sound. Other prosodic aspects that may be included comprise: superfast, loud, diaphragm, whisper, staccato, and three-second pause. Superfast may be considered as speaking some words or parts of a speech at an unusually fast speed. Loud or loudness is similar to volume but differs in the sense that the variations in spoken sound level may be less subtle. Another type of prosody which may be included is alliteration. It will be understood therefore that the methods of the invention herein disclosed can employ any and all known types of prosodic features and/or prosodic techniques and that there are overlaps between such prosodic features and/or prosodic techniques.

Design Requirements.

Based on the interviews with domain experts, a set of design requirements/objectives were consolidated in order to effectively derive insights from a large-scale speech dataset.

R1: To support quick identification of speeches with similar narration styles or distinctive speeches. Given a speech dataset, it is important to provide users with an overview that shows groups of speeches sharing similar narration styles or a few speeches as outliers. It gives users a rough idea of the dataset and serves as the entry point of the analysis.

R2: To present speech-level temporal distribution of prosodic features. For each speech, it is necessary to show the evolution of prosodic features. Since speeches may vary in length and prosodic patterns, the proposed design needs to handle the variance of scales among different speeches.

R3: To present sentence-level distribution of prosodic features. Upon analyzing the prosodic features of a speech, it is helpful to allow users to narrow down to single sentences. The sentence-level design should keep certain prosodic information to keep users aware of the speech context.

R4: To compare prosodic features of sentences with similar constituent structure. After identifying a sentence with desired prosodic patterns, it is still tedious for users to search for similar ones manually. Therefore, the system should provide an automatic method to identify similar sentences.

R5: To summarize prosodic patterns of a specific word or phrase. It is also helpful to summarize prosodic patterns of a selected word/phrase, and hence tell users what kind of narration strategies can be chosen from for that word/phrase.

Guided by the aforementioned design requirements, the system of the present invention has been designed and developed which relates to a visual analytics system for interactively exploring narration strategies in a large-scale speech dataset.

FIG. 1 shows an exemplary embodiment of a signal processing system 100 in accordance with concepts of the present invention. In the illustrated embodiment, the signal processing system 100 comprises a computer processing device such as a communication equipment (e.g. a smart phone), a tablet computer, a laptop computer, a personal computer (PC), or the like, although any suitable data processing device or system may be utilized. The signal processing system 100 may be connected via a communication network to a server and/or to a database 106 or the like, although this is not essential to the implementation of the invention. The communication network may comprise a wireless network, e.g. a wireless cellular network, a wired network, the internet or any combination of the foregoing.

The signal processing system 100 may comprise a plurality of functional blocks for performing various functions thereof. For example, the signal processing system 100 may include a receiver module 110 providing received signal processing and/or configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing via antenna 105 and/or another type of system input, although it will be understood that audio signals in the form of audio speech clips may be received or inputted to the receiver module 110 of the signal processing system 100 by suitable means familiar to one skilled in the art. Furthermore, it will be appreciated that it is not essential to the implementation of the aspects of the invention that the signal processing system 100 is able to receive and/or transmit signals. The signal processing system 100 may comprise a stand-alone device or system. Irrespective of the presence or particular configuration of receiver module 110, embodiments may include a signal analysis module 130 for extracting prosodic features from a received or inputted audio signal, a signal alignment module 140 for aligning the extracted prosodic features with a script derived from or associated with the audio signal, a script segmenting module 150 for segmenting the script with the extracted prosodic features into structural blocks of a first type, and a part-of-speech (POS) tag extractor module 180 for extracting tags from the script or a structural block of the script.

Although the signal analysis module 130, the signal alignment module 140, the script segmenting module 150 and the POS tag extractor module 180 are shown as being deployed as part of the receiver module 110 (e.g. comprising a portion of the receiver module control and logic circuits), there is no limitation to such a deployment configuration according to the concepts of the invention. For example, each of the signal analysis module 130, the signal alignment module 140, the script segmenting module 150, and the POS tag extractor module 180 may be deployed as respective functional blocks of the signal processing system 100 that is distinct from, but connected to, the receiver module 110 if present. Each of the signal analysis module 130, the signal alignment module 140, the script segmenting module 150, and the POS tag extractor module 180 may, for example, be separately implemented using logic circuits and/or executable code/machine readable instructions stored in a memory 160 of the signal processing system 100 for execution by a processor 170 to thereby perform functions as described herein. For example, the executable code/machine readable instructions may be stored in one or more memories 160 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 160 may comprise processor-readable memories for use with respect to one or more processors 170 operable to execute code segments of any of the signal analysis module 130, the signal alignment module 140, the script segmenting module 150, and the POS tag extractor module 180 and/or to utilize data provided thereby to perform functions of the signal processing system 100 as described herein. Additionally, or alternatively, each of the signal analysis module 130, the signal alignment module 140, the script segmenting module 150, and the POS tag extractor module 180 may comprise one or more special purpose processors (e.g. application specific integrated circuit (ASIC), field programmable gate array (FPGA), graphics processing unit (GPU), and/or the like configured to perform functions of the signal processing system 100 as described herein.

More specifically, in the audio signal processing method of the invention, a first step is to extract prosodic features from a received or inputted audio signal. The audio signals to be processed preferably comprise digital audio clips of human speeches, preferably in digital format, but, for some embodiments, may comprise synthesized speeches, e.g. speeches generated from texts by a computer synthesizer application or the like. The signal analysis module 130 preferably comprises a speech synthesis or speech analysis module 130 and may, in some embodiments, comprise a known speech analysis tool named Praat (P. Boersma. Praat, a system for doing phonetics by computer. Glot international, 5, 2002) for feature extraction, although any suitable speech analysis tool may be utilized. The desired/required prosodic features, including pitch and intensity, are extracted to a form of time series with a predefined, selected or calculated sample rate. A sample rate of 0.01 seconds may be chosen as this is considered sufficiently fine-grained enough for the analysis, but other sample rates may be chosen.

The next step is to align the extracted prosodic features with a script derived from or associated with the audio speech clip being processed. The signal alignment module 140 which preferably comprises a speech to text alignment module 140 may, in some embodiments, comprise an existing speech to text alignment tool named Gentle (https://lowerquality.com/gentle/) which is a robust yet lenient toolkit for aligning speech with text, although any suitable speech to text alignment tool may be utilized. After alignment, the start and/or end timestamp of each unigram, i.e. word, are labelled which allows easy automatic drawing or alignment of prosodic features along the script. Additionally, or alternatively, this is preferably performed for bigrams and may also be performed for trigrams, etc. in the script.

In a next step, to enable sentence-level and word-level analysis, the script segmenting module 150 which preferably comprises a human language analysis module 150 and which may, in some embodiments, comprise CoreNLP (C. Manning, M. Surdeanu, J. Bauer, J. Finkel, S. Bethard, and D. McClosky; the stanford corenlp natural language processing tool; in Proceedings of the 2014 Annual Meeting of the Association for Computational Linguistics: System Demonstrations, pages 55-60, 2014) is used to segment the script into structural blocks of a first type, such as, for example, clauses, phrases and/or sentences, comprising the script, although any suitable human language analysis tool may be utilized. More preferably, the structural blocks of a first type comprise sentences comprising the script. Since the script is already aligned with a timeline of the audio clip, this step will automatically and simultaneously segment the already aligned prosodic feature values with the structural blocks of a first type.

The unigrams, bigrams and/or trigrams, etc. in the script can be considered as comprising structural blocks of a second type.

Figure 2:
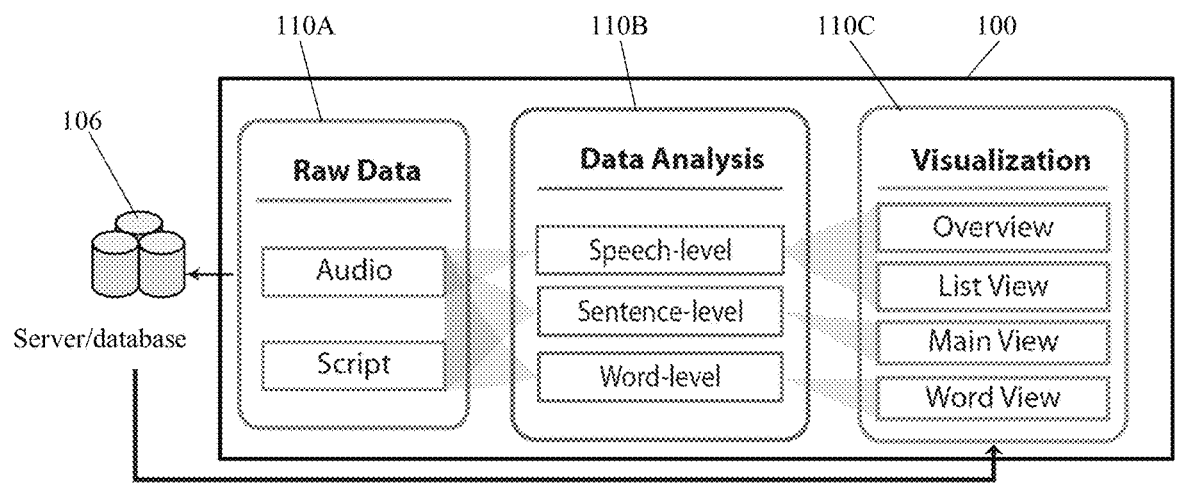
FIG. 2 depicts an enhanced architecture of the signal processing system of FIG. 1.

FIG. 2 depicts an enhanced architecture of the signal processing system 100 connected directly with or via a network to server/database 106 where such are present, although the signal processing system 100 may comprise a stand-alone device or system. The signal processing system 100 is configured not only to process audio speech clips via the receiver module 110 in the form of a Data Analysis module 110A as herein described to extract prosodic features, etc., but it may also be configured to extract data via a Raw Data module 110B including scripts from such audio speech clips as well as to establish visualizations of the processed audio speech clips via a Visualization module 110C as hereinafter described of the processed audio speech clips. It will be understood that each of the Data Analysis module 110A, the Raw Data module 110B, and the Visualization module 110C may be deployed as respective functional blocks of the signal processing system 100 that are distinct from, but connected to, the receiver module 110. Each of the Data Analysis module 110A, the Raw Data module 110B, and the Visualization module 110C may, for example, be separately implemented using logic circuits and/or executable code/machine readable instructions stored in a memory 160 of the signal processing system 100 for execution by a processor 170 to thereby perform functions as described herein.

When a user identifies a useful speech or spoken narration style, the signal processing system 100 can benefit users by providing structural blocks of the first type, e.g. sentences, with similar structures to a selected structure. In this way, users can validate and summarize their hypothesis and better understand their narration strategy. However, it is understood that existing, i.e. conventional, sentence to sentence querying methods are mostly based on semantics or topics. For example, given an input sentence "I have a dream, a beautiful dream", most existing methods will query sentences talking about the word "dream". In the present invention, a sentence with a similar structure such as "We have a problem, an environmental problem." is more useful for a user to learn a narration style. Therefore, the present invention preferably provides a constituent structure-based similarity (CSS) to measure the distance, such as edit distance, between a structural block of the first type derived from the script with another structural block of the first type, e.g. a sentence or the like from the script with a sentence or the like also from the script or from another source such as, for example, a user input or user selection. The distance measure preferably comprises a measure of similarity between the structural block of the first type derived from the script and the other structural block of the first type. This may comprise, for each of the structural block of the first type derived from the script and the other structural block of the first type, extracting POS tags for each structural block of a second type comprising said structural block of the first type to form a POS sequence and then calculating an edit distance between the POS for the structural block of the first type derived from the script and the POS for the other structural block of the first type. The edit distance between the POS for the structural block of the first type derived from the script and the POS for the other structural block of the first type is preferably calculated using the Damerau-Levenshtein distance.

More specifically, the measure of similarity between the structural block of the first type derived from the script and the other structural block of the first type may be determined from equation 1:

$$CSS(S_1, S_2) = \min \Sigma \|edits(CS_{S_1}, CS_{S_2})\| \qquad (1)$$

where $CS_{S_1}$ and $CS_{S_2}$ are the constituent sequences of two sentences and $CSS(S_1, S_2)$ is the calculated similarity. To be more specific, for each word/phrase in a sentence, the POS tagger extractor module 180 which, in some embodiments, may comprise a known tagger extractor tool, such as that disclosed in K. Toutanova, D. Klein, C. D. Manning, and Y. Singer; Feature-rich part-of-speech tagging with a cyclic dependency network; In Proceedings of the 2003 Conference of the North American Chapter of the Association for Computational Linguistics on Human Language Technology-Volume 1, pages 173-180; Association for Computational Linguistics, 2003, to extract a tag such as verb with past tense or pronoun, although any suitable tagger extractor tool may be utilized. In this way, a sentence can be transformed into a sequence of POS tags. Then, the CSS can be transformed to the similarity between these two sequences using, for example, the Damerau-Levenshtein distance (E. Brill and R. C. Moore. An improved error model for noisy channel spelling correction. In Proceedings of the 2000 Annual Meeting on Association for Computational Linguistics, pages 286-293. Association for Computational Linguistics, 2000), which is a commonly used distance method for measuring the similarity of various event sequence data, to finally calculate the CSS.

Figure 3:
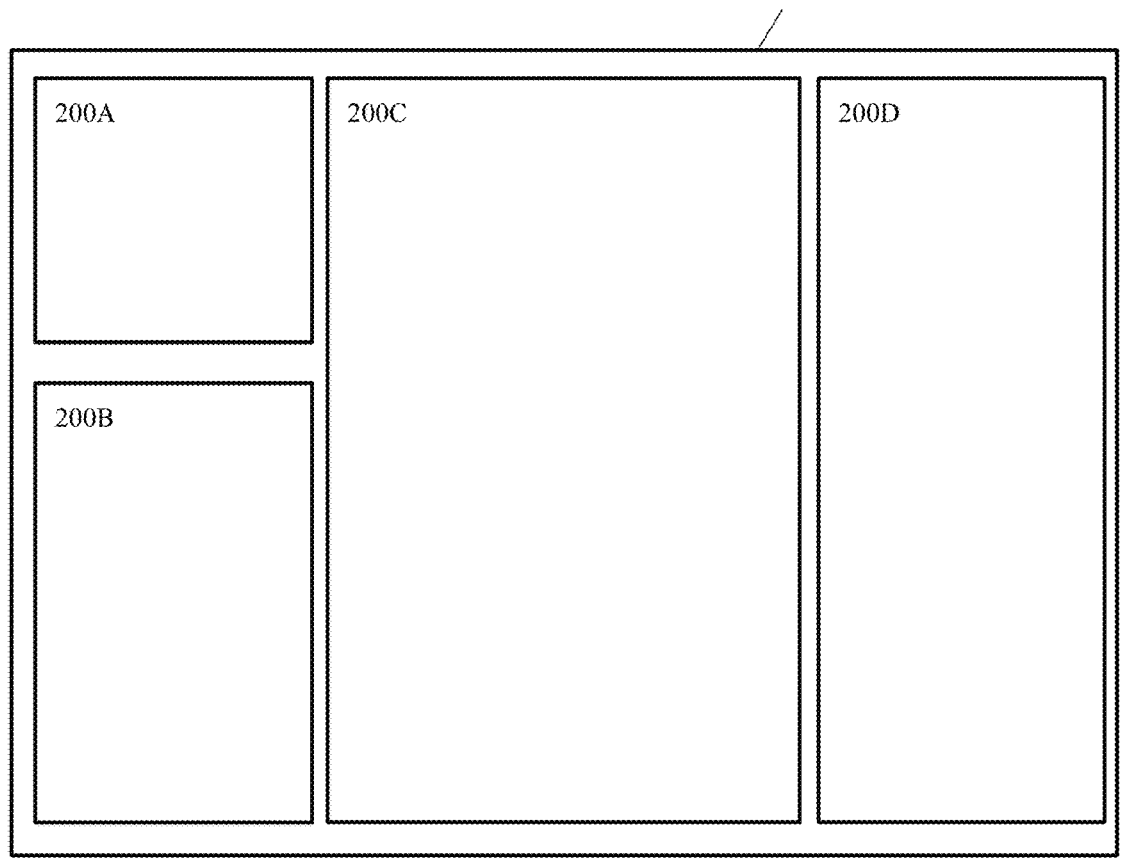
FIG. 3 shows a screenshot of a user interface for the signal processing system of FIG. 1.

The signal processing system 100 is designed to fulfill the above described design requirements, while following the general design guideline of multiple levels of detail analysis. FIG. 3 shows a screenshot of a user interface 200. The user interface 200 consists of four linked views 200A, B, C, D: the overview 200A which shows the prosodic feature distribution in speech-level, the list view 200B which displays selected speeches with their temporal prosodic feature evolution, the main view 200C supporting sentence-level analysis, and the word view 200D showing the intonation summary of a word. It will be understood that the layout of the linked user interface views 200A, B, C, D shown in FIG. 3 is merely an example of one such layout and that said views 200A, B, C, D may be arranged differently in some embodiments.

Figure 4A:
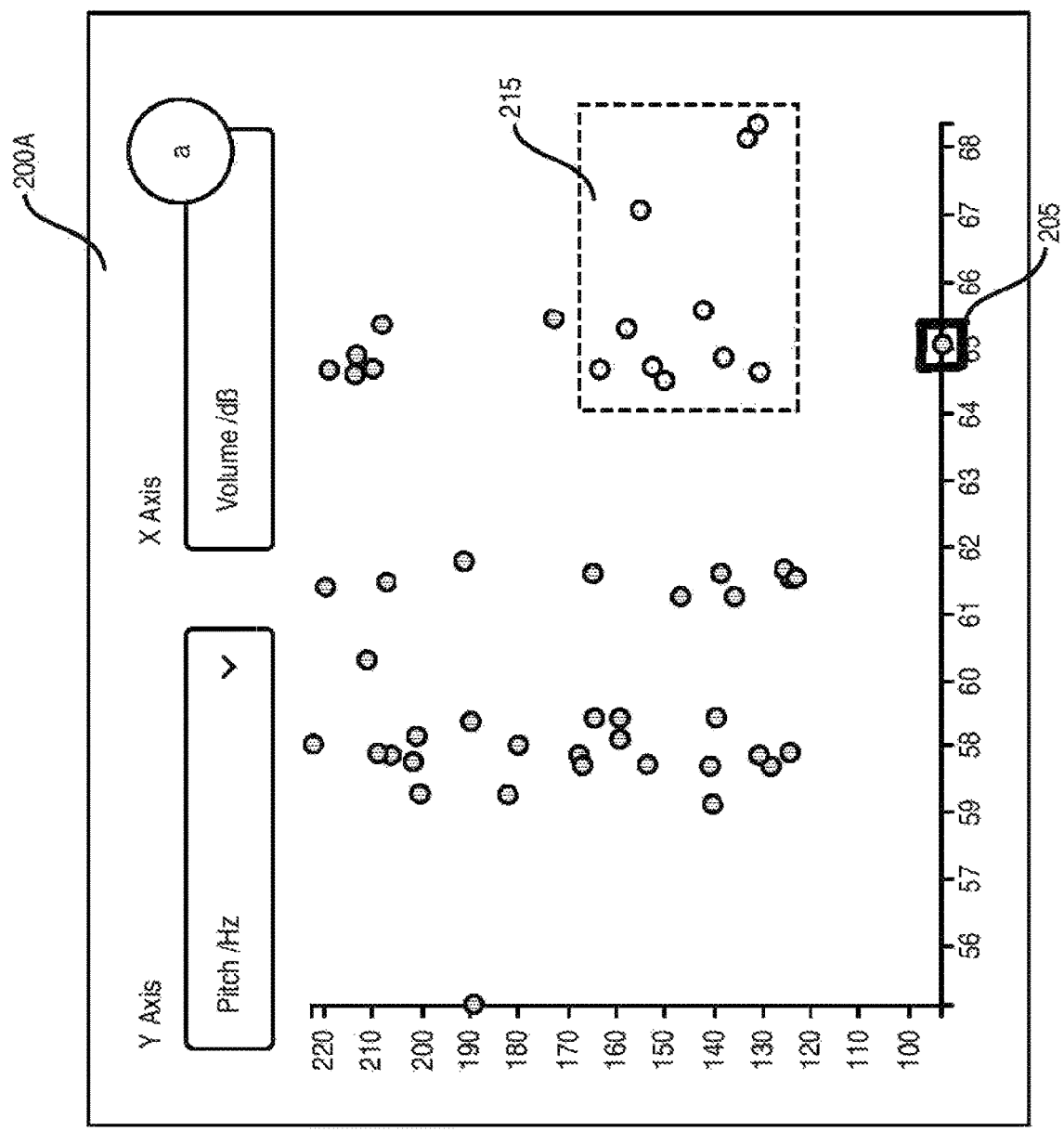
FIG. 4A-D show overview, list view, main view and word view parts respectively of the user interface for the signal processing system of FIG. 1.

FIG. 4A provides a more detailed view of overview 200A which is configured to illustrate the overall distribution of speeches to meet objective R1 above. The overview 200A consists of a scatter plot where each node represents a speech. By preference, the x and y-axis represent volume and pitch, respectively, but users may be enabled to change either or both axes to encode other attributes, such as average sentence length, sentence count, etc.

Figure 4B:
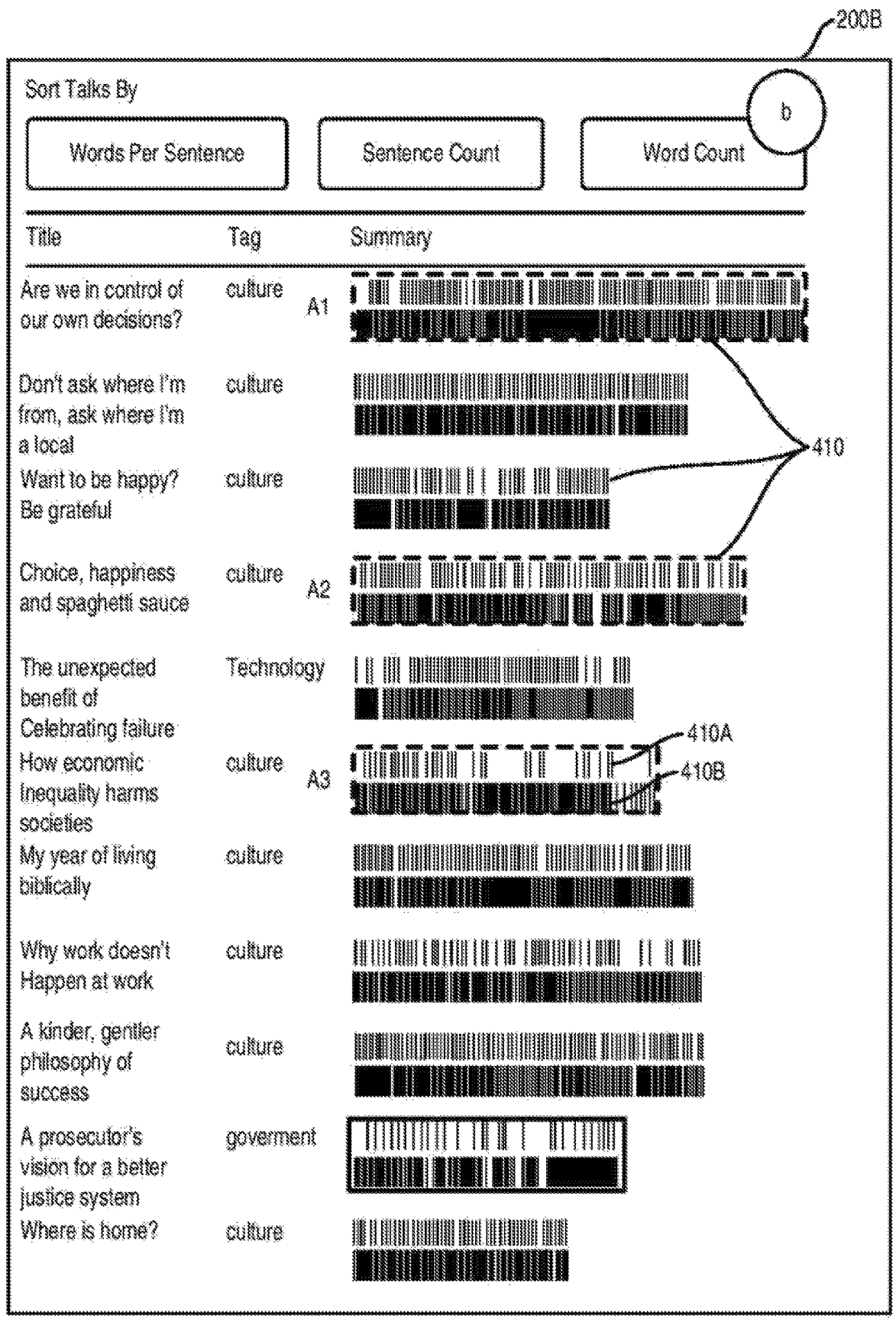

FIG. 4B provides a more detailed view of the list view 200B which presents the attributes of each speech in a tabular form. The three columns display a speech title, tag and temporal distribution of prosodic features to meet objective R2 above. Speeches can be ranked in order by their word count, sentence count, etc. The list view 200B visualizes the temporal distribution of each speech with a space-filling representation 410. In FIG. 4B, the upper half 410A of each representation 410 represents the distribution of pitch and the bottom half 410B of each representation 410 represents the distribution of volume. The opacity of the halves 410A, B of each representation 410 may encode values over time of the represented features. This type of representation of features may be used consistently used in other user interface views.

If a user identifies a group of speeches, he/she wishes to further explore, they can click or use a lasso selection or similar operation on the speeches in, for example, the overview 200A and the list view 200B will automatically be updated to show the filtered results. In this way, users can only focus on a relevant or selected part of the dataset. To further drill down to a lower level analysis, users can click on a speech in the list view 200B, and then the main view 200C (FIG. 4C) will be updated to show the clicked speech.

Figure 4C:
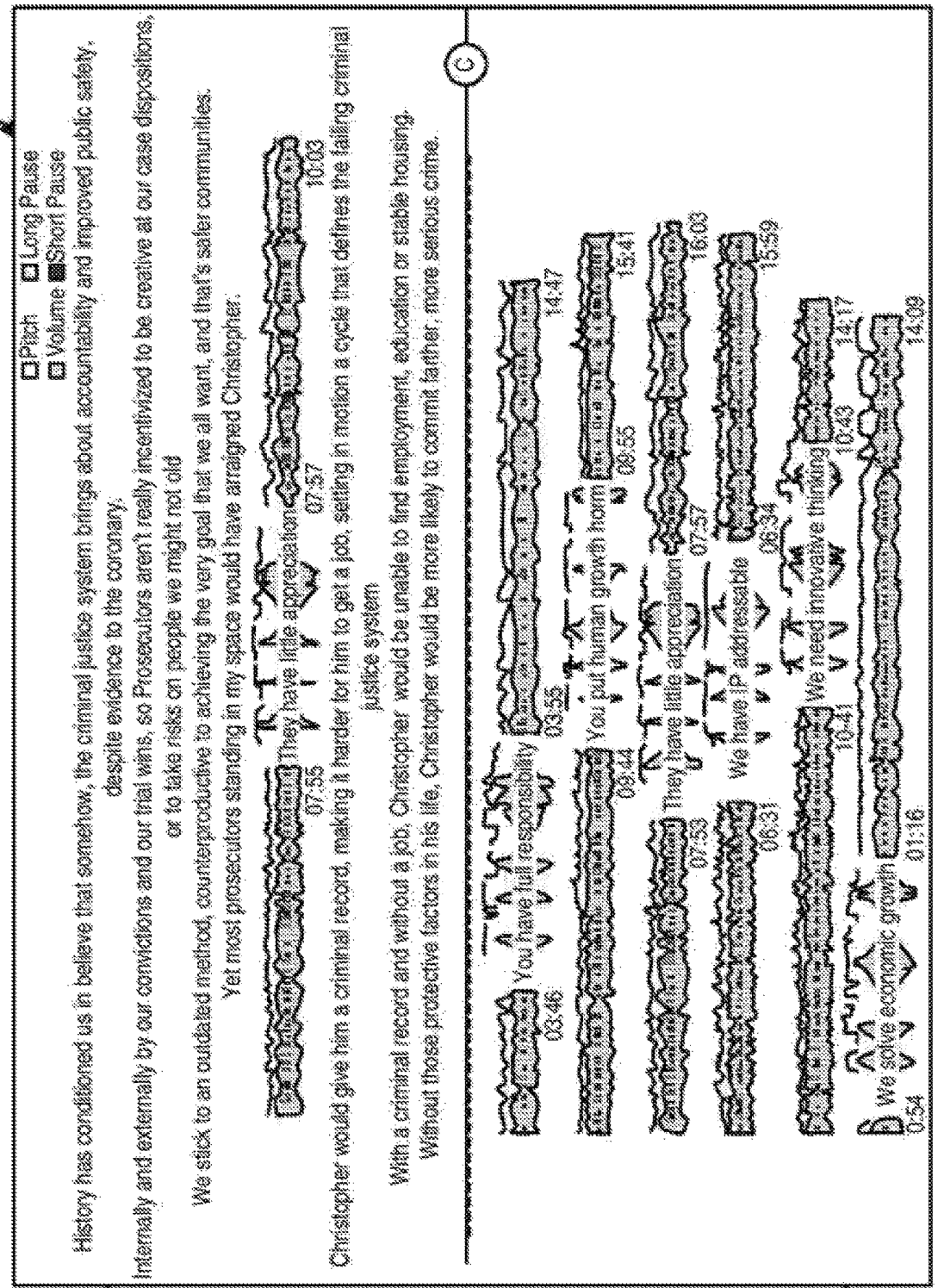

FIG. 4C provides a more detailed view of the main view 200C which consists of two parts. A top part 420A shows the prosodic features of a speech with a focused sentence to achieve objective R3 above. A bottom part 420B visualizes a user's querying results. The dashed line shows the separation of the two part-views 420A, B. Since this is the user interface view displaying both prosodic features and semantics of the script, users can directly learn potentially useful narration strategies by exploring this view. Therefore, the main view 200C is considered as the core view of the visualization system of the invention.

Figure 5:
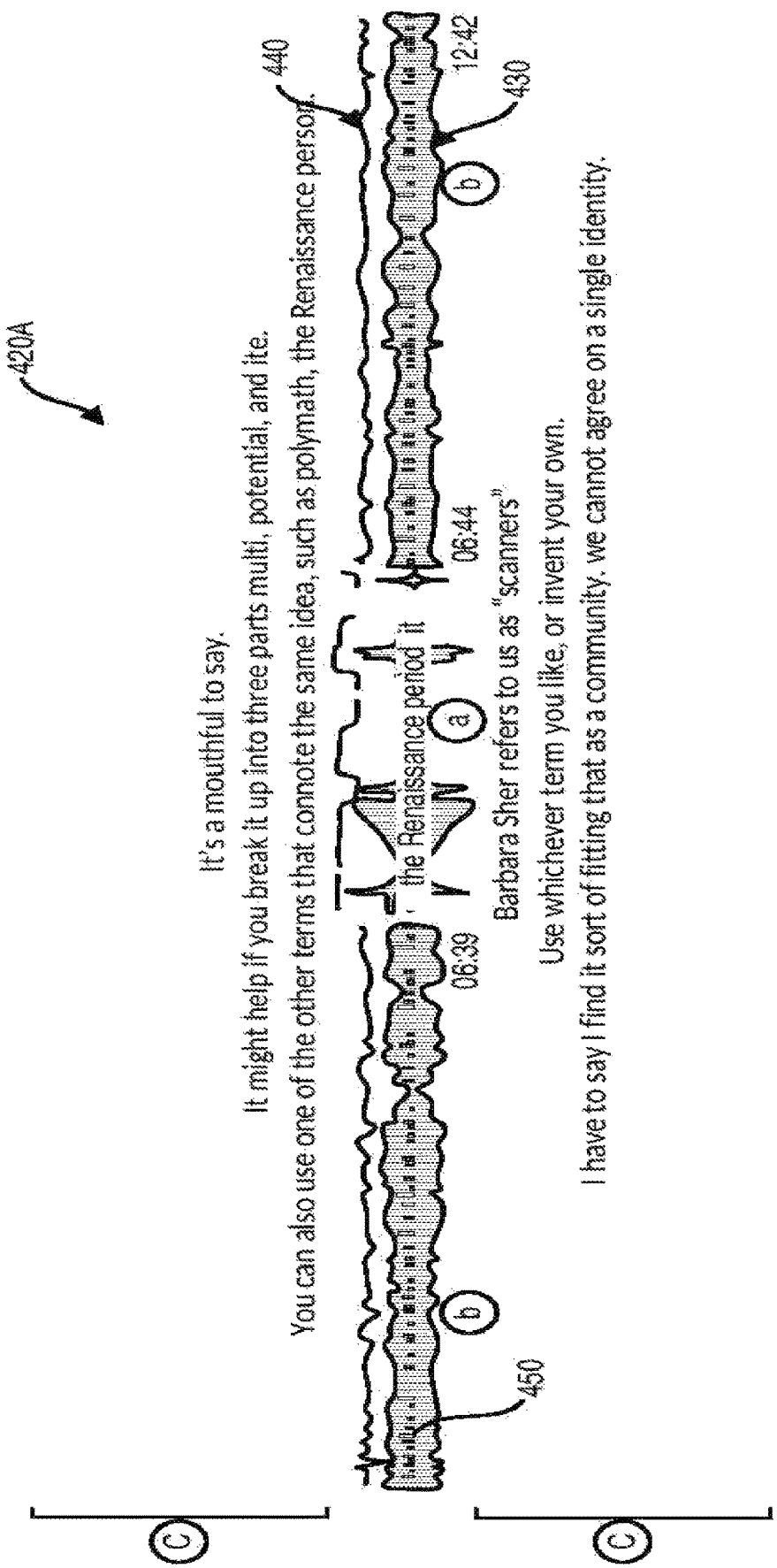
FIG. 5 shows an enlarged view of a top part of the main view of the user interface for the signal processing system of FIG. 1.

FIG. 5 shows an enlarged view of the top part 420A of the main view 200C. This comprises a novel focus+context design to preserve the context of a selected sentence while keeping the design scalable to the length of the represented speech. To be more specific, first the focused sentence is directly placed along with a horizontal timeline and an overlay of its prosodic features as shown at (a). A volume chart 430 overlying the displayed text encodes volume values and a line chart 440 drawn above the volume chart 430 presents the pitch values. The design rationale is that the width or depth of the volume chart 430 naturally conveys whether the represented attribute is stronger or weaker, while the line chart 440 may be considered more intuitive to present values that become higher or lower. In addition, the duration of pauses between words may be encoded by blank spaces in the text, i.e. between words in the text, so users can easily observe whether there is a clear pause or not between words or other structural blocks in the displayed text of the script.

Furthermore, the timeline is extended to draw remaining parts (i.e., the context) of the speech before and after the focused sentence at each (b). In this way, the focused sentence has a visual effect as an expanded detail view, which is intuitive to analyze according to users' feedback. Users can click on the volume chart 430 to change the focused sentence. To ensure consistent visual encoding, it is preferred that the same volume chart 430 and line chart 440 are used to encode volume and pitch for each displayed sentence with only a possible modification of the time scale to fit the context in the screen view. Each pause between sentences may be encoded by a vertical bar 450 on the timeline. The height of the bar 450 displays the duration of the pause. In this way, users can identify interesting pause patterns (e.g., dense pause usage or an unusually long pause) and quickly locate the corresponding sentences.

Only showing the text of a single sentence may limit a user's cognitive ability to understand the content of the speech. Therefore, context sentences are displayed vertically along the focused sentence as at each (c). For each (c), the font size and opacity are preferably decreased for the context sentences to encode the distance between such a sentence and the focused sentence, so a context sentence is smaller and lighter if it is further away from the focused sentence.

The design of the main view 200C requires several design alternatives to be considered and implemented.

Figure 6:
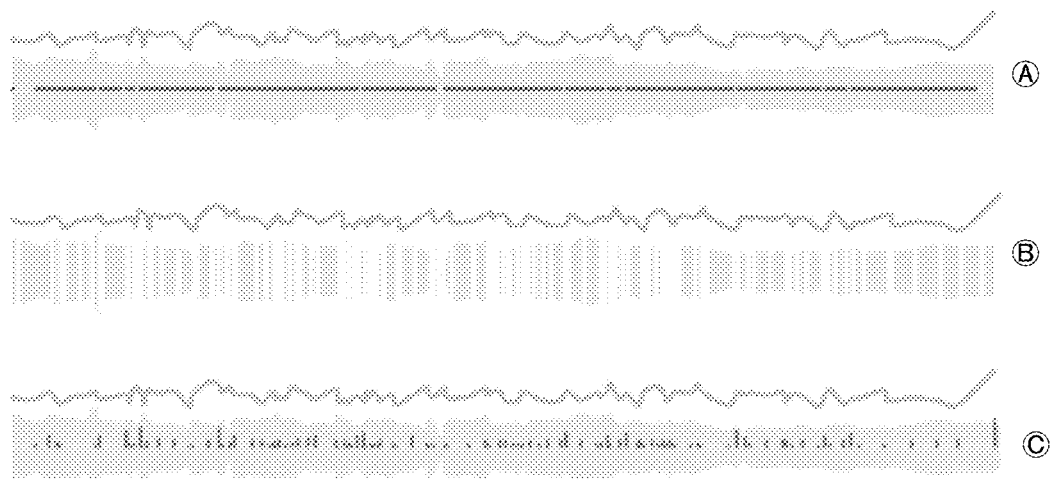
FIG. 6 shows design alternatives for a timeline of the user interface for the signal processing system of FIG. 1.

Since it is desired to provide visual cues of the focused sentence and for the context to be consistent, all the scripts are compressed to a straight line and utilize the segments of this line to encode each sentence. Then, the pause between context sentences can be encoded as the blank space between line segments as illustrated more clearly in FIG. 6 which displays design alternatives: (A) showing a segmented horizontal timeline; (B) showing a segmented volume chart; and (C) showing the preferred timeline as seen in FIG. 4C and FIG. 5. For example, it is possible as in (B) to divide the volume chart 430 into segments and use blank spaces in the volume chart 430 to indicate pauses. However, since the scripts can have varying lengths and number of sentences, the available blank space can be limited to clearly show the pause duration. For example, it can be difficult to discriminate a 1 second pause from a 10 second pause. Therefore, it is preferred to use the timeline bar chart of (C) to represent each pause. In this way, the tall bar indicating unusual long pause can easily catch users' attention.

Figure 7:
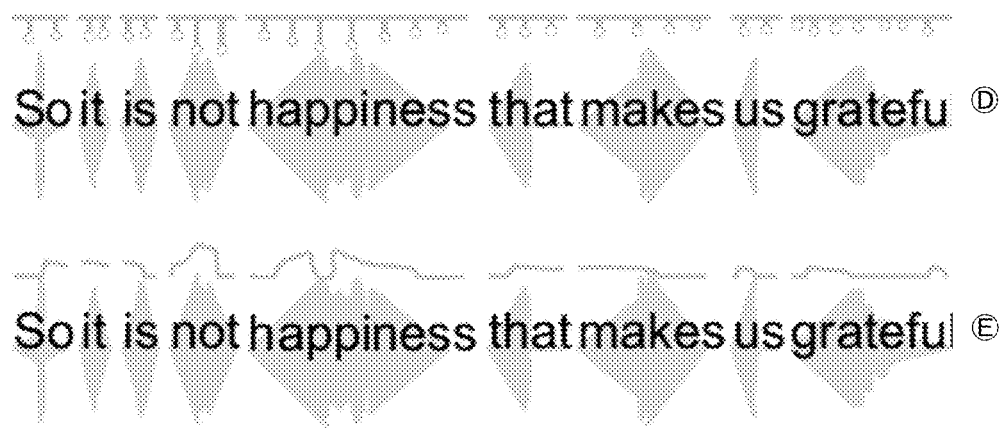
FIG. 7 shows design alternatives for representing pitch in the timeline of the user interface for the signal processing system of FIG. 1.

When encoding the pitch value, one possibility it to use a visual metaphor of music notes as shown at (D) in FIG. 7. In this design, the average pitch value of each syllable in the focused sentence is first calculated and visually encoded as a musical note. This metaphor design may be selected because, when speakers practice their intonation, they tend to train their pronunciation syllable by syllable. However, it is preferred to use the line chart design (E) because: 1) line chart (E) is better in revealing the trend of pitch values, so users can easily observe the intonation of multiple words or a whole sentence; and 2) although speakers are familiar with syllable level intonation, it is observed that users' cognitive ability can easily match the line chart to each syllable by reading the text.

For comparison of similar sentences upon users selecting a focused sentence, the signal processing system 100 will take this sentence as input and use the previously described CSS query to search for similar sentences, namely sentences having a similarity measure within a predefined, selected or calculated range or margin with respect to the distance measure for the user selected sentence. With the query result, the signal processing system 100 will also display the prosodic features of these sentences at the bottom part 420B of the main view 200C. To compare and summarize the narration strategies among these sentences, a side-by-side visual comparison is used and encode prosodic features in the same way as the focused sentence to thereby achieve objective R4.

Figure 4D:
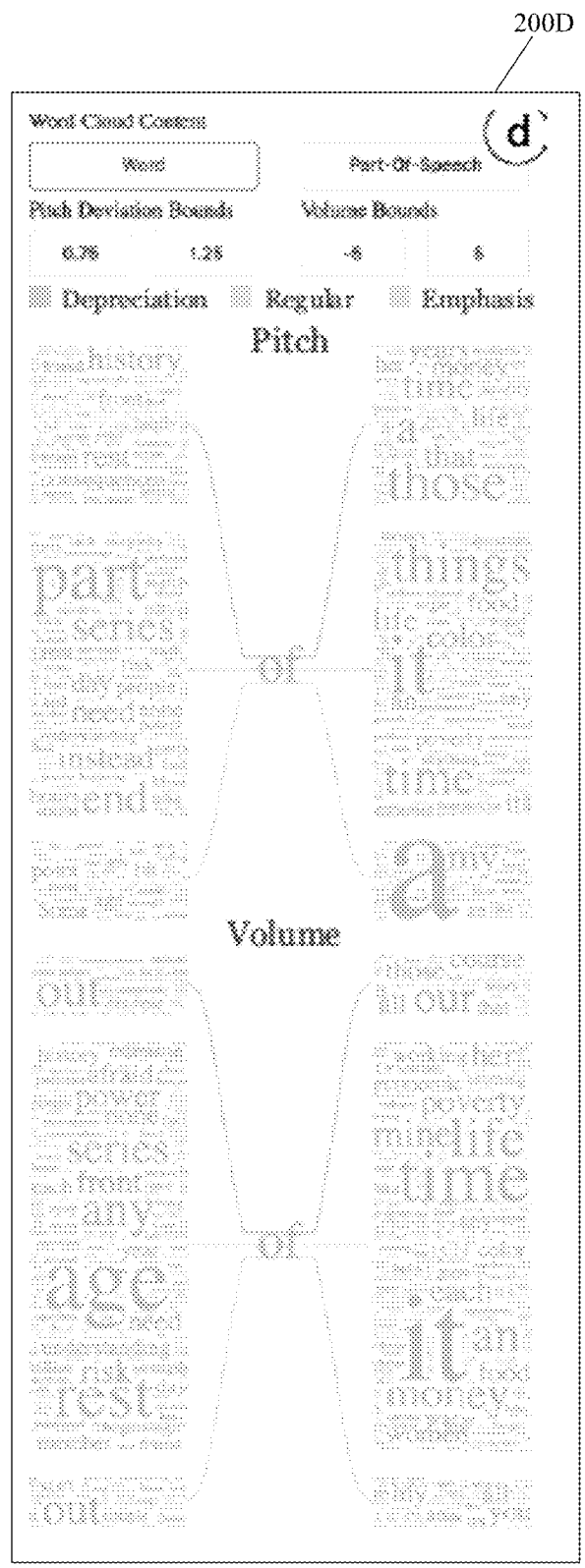
Figure 8:
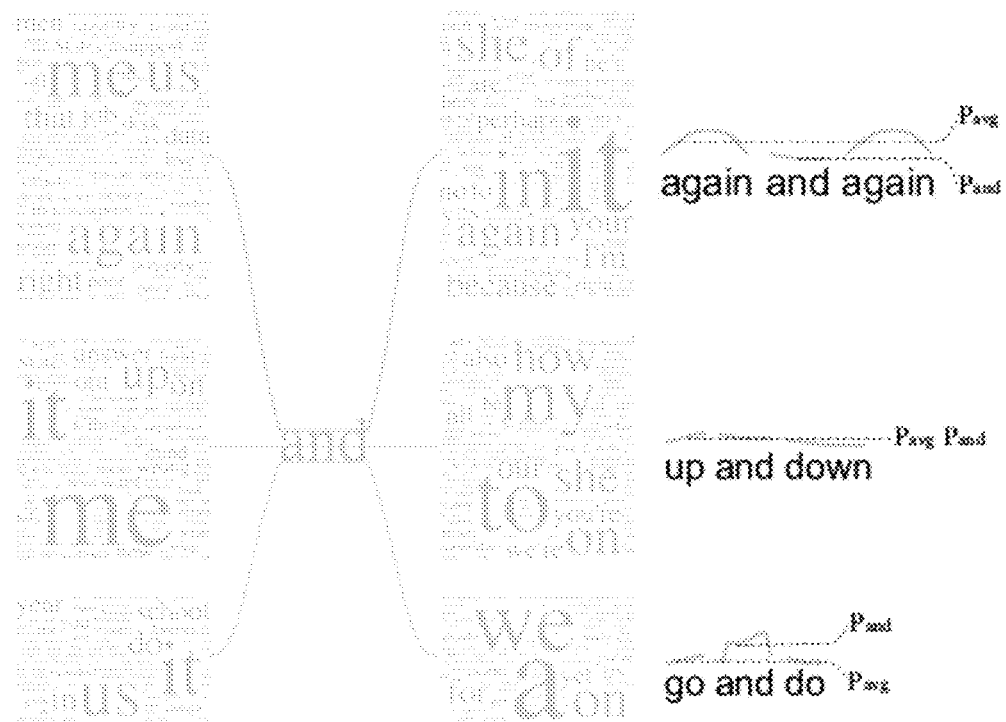
FIG. 8 illustrates a word cloud in the word view of the user interface for the signal processing system of FIG. 1.

Although the main view 200C can help users find a sentence with a desired narration style, users usually need more samples to understand and generalize their findings. The side-by-side comparison in the main view 200C can provide more sentence samples. Another option, however, is to provide more narration samples for a critical word in the focused sentence, such as a transition word. The word view 200D as shown in FIG. 4D is designed for this purpose and achieves objective R5. FIG. 8 illustrates a word cloud in the word view 200D where occurrences of a user selected word are classified into three groups from top to bottom: depreciation; regular usage; and emphasis, according to the prosodic feature values.

More specifically, to provide a summary of all the sample usages of a given word, all the occurrences of the given word can be retrieved. Then, to give users hints about the usage of narration for the word, the intonation of this word can be classified into three categories as above, e.g. emphasis, depreciation and regular usage. To illustrate this, typical pitch values for each of the categories is shown in FIG. 8. According to a previous study, both volume value and pitch deviation can help to detect an emphasized word. Therefore, in one embodiment of this invention, the words can be classified in a similar but simpler way. Preferably two classification results are generated based on the volume value and the pitch deviation, respectively. For the volume value, given a word, the average volume value of the antecedent and subsequent words is calculated. Then, if the volume value of the selected word is larger or smaller than the average by a predetermined, selected or calculated threshold $\lambda_1$, it is classified as emphasis or depreciation, respectively. Otherwise, it is considered as a regular usage. Similarly, all the occurrences of the given word can be grouped based on the pitch deviation with another predetermined, selected or calculated threshold $\lambda_2$. In one embodiment, the two thresholds are set to 25% and 5 dB, respectively. Users can adjust the thresholds through the user interface.

For a selected word, the word cloud of FIG. 4D and FIG. 8 is used to visualize the context information. For each of the three categories, the antecedent and subsequent words of the selected word are collected to generate a word cloud, respectively. As shown in FIG. 8, word clouds are linked with curves, and the color and shape of the curves denote the intonation categories. The height of each word cloud represents the number of occurrences of the selected word, allowing users to observe the most commonly used intonation strategy. The word distribution inside word clouds helps users understand the context of the word. By changing the settings, the signal processing system 100 allows users to replace all the words with their POS tags, and to generate word clouds based on tag distribution.

The timelines described herein provide the technical advantage that, when searching a speech dataset, the locations of results provided or displayed to a user within the scripts or the associated audio signals can readily be found through use of any timestamps associated with said results.

The use of the similarity measures based on POS tags has the technical advantage that it enables a user to identify speeches or parts of speeches with similar narration styles despite the structural blocks being used for the similarity measure not being linguistically or syntactically similar or linked, i.e. the structural blocks being used for the similarity measure are structurally similar, but need not be linguistically or syntactically similar or linked. This enables a user to search a very large database of speeches which may be unrelated in subject matter and which may use very different vocabulary, but which have similar narration styles due to similar underlying word structure(s).

Case Studies

In this section, the effectiveness and usefulness of one embodied system of the present invention is evaluated using case studies. Users included two domain experts (herein denoted by E0 and E1) and two graduate students (herein denoted by S0 and S1).

51 TED Talk audios and scripts were collected from four topics, i.e., education, government, technology, and culture. Each of these lasted from 12 to 18 minutes with about 1,536 to 3,111 words and 76 to 263 sentences. The embodiment of the signal processing system 100 for the case studies was implemented as a web-based application and semi-structured interviews were conducted with users. Each interview lasted about one hour. During the interviews, the features in the present the signal processing system 100 were introduced, and then users were allowed to freely explore the data with the signal processing system 100. Finally, users were interviewed about the insights they gained during the exploration, as well as the strengths and weaknesses of the system 100. Users' analytic processes are summarized as follows.

Speech Overview

First of all, users wanted to obtain a big picture of the displayed speeches (R1). After the data was loaded into the system 100, the overview 200A showed the scatter plot with volume and pitch as x and y-axis. S0 noticed that there was a speech with low pitch values, compared with other speeches (marked by box 205 in FIG. 4A). He exhibited interests, "I want to explore this speech because the voice of the speaker may be closer to my deep voice, and maybe I can imitate his narration styles." E1 changed the x-axis and observed the scatter plots. After changing x-axis to represent average sentence length, E1 mentioned "I can easily locate speakers who use complex sentences and those who use short sentences. The difference between these two styles is meaningful to further investigate."

Narration Styles Identified by Prosodic Features

Next, the users wanted to analyze the narration styles at the speech-level (R2). S1 was interested in the speeches with relatively high volumes, so he selected them with the lasso tool in the overview 200A (as depicted by dashed line box 215 in FIG. 4A). Then he inspected the temporal distribution of each speech in the automatically updated list view 200B. He noticed that the top rows 410A (FIG. 4B) kept consistent opacity along the timeline while three of them started with high opacity areas (marked as A1-A3 in FIG. 4A), indicating low pitch values at the beginning of the corresponding speeches. "The three speeches may have different narration styles from others", he inferred. To find the specific reason, S1 clicked each speech in the list view 200B and then browsed their scripts in the main view 200C. After careful comparison, he found that the three speeches started with explanations while others told stories or asked questions. "When speakers start their talks with explanations which is usually less emotional, they tend to use low pitch", S1 concluded, "This gives me an insight about starting with explanations. However, I prefer to have a strong opening in my speech, so I would avoid to use it as the opening."

Figure 9:
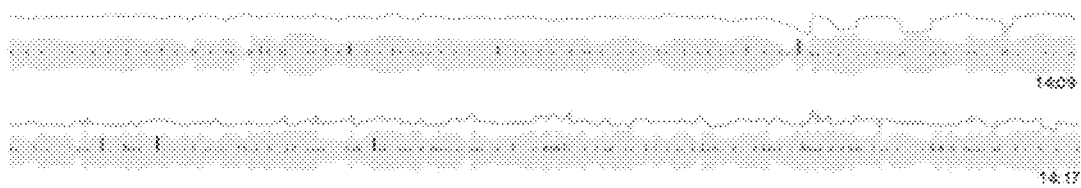
FIG. 9 illustrates speech 'fingerprints' in the timeline of the user interface for the signal processing system of FIG. 1.

S1 continued to explore the prosodic features in the main view 200C. With the thought that the context diagram could be considered as a fingerprint of a speech, and could be used to discriminate different narration styles, he paid attention to the diagrams and the pitch curves, volume areas and vertical bars in them. He observed that two speeches had quite different fingerprints. One speech about "economic growth" had a smooth pitch curve and sparse vertical bars (FIG. 9 top timeline), indicating its small pitch variation and few pauses. In contrast, the fingerprint of the other speech (FIG. 9, bottom timeline) which was about collaboration between conservatives and liberals, contained a more zigzag pitch curve and much denser vertical bars. After investigating the raw audios and scripts of the two speeches, S1 identified two different narration styles: "The speaker talking about economic growth doesn't change his pitch a lot, since he just explains the economic phenomenon and uses mostly explanations and long sentences. On the contrary, bigger pitch variation and more pauses are used in the other one, because the speaker is more emotional and uses a mixture of explanation, jokes and story-telling."

Distinct Narration Strategies

To investigate more detailed narration strategies in the sentence-level (R3), E0 used the focus+context design to explore a technology speech about a digital farm. E0 browsed its contextual text and found the phrase "what if" occurred several times in different sentences. For further investigation, he clicked on one of them. Then the focused sentence switched to the clicked sentence with its prosodic features (FIG. 10 ⓐ). He noticed the blank space between "what if" and subsequence words, indicating a long pause. Keeping this pattern in mind, E0 wanted to check the usage of other occurrences of "what if" (R4), so he queried this sentence. The screenshot of the querying results is shown in FIG. 10 ⓑ.

Figure 11:
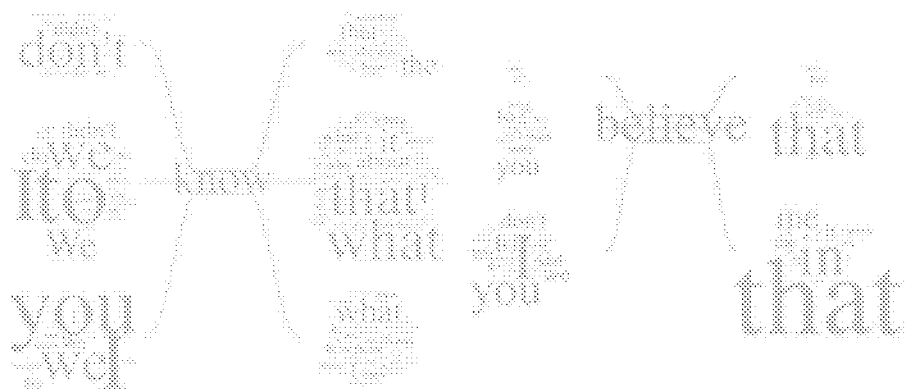
FIG. 11 illustrates user querying of words in the timeline of the user interface for the signal processing system of FIG. 1.

Referring to FIG. 11, from the querying results, E0 noticed that there was blank space after the phrase "what if" while no such space appeared after the occurrence of the single word "if". E0 inferred, "It seems that the speaker pauses every time he speaks "what if". On the contrary, he doesn't pause when he says the single word "if". This pattern might suggest a distinct usage of strategic silence after the phrase what if." After checking the audio, E0 validated his hypothesis. "The speaker tries to explain his idea of digital farm. He uses the phrase what if and the silence after it to emphasize the impact of the technique and provide space for the audience's imagination. Moreover, the subtle difference between the duration of the pauses prevents the narration from being sounded too mechanical", E0 explained, "This is a good example with such narration strategies. However, I may overlook the pattern when listening to the audio if there are no visualized prosodic features assisting me."

Word Level Intonation Strategies

When exploring the focused sentence, some users clicked on a word, especially commonly used words, to check the summary of its intonation usage (R5). Several patterns had been found during this process. We report only two examples here.

The first pattern is related to the word "know". Mostly, words "don't" and "didn't" occur before the word "know" when it is depreciated (FIG. 11, left-hand side). It means that speakers tend to depreciate the word "know" when expressing a negative notion. The second pattern is about the word "believe". When "believe" is emphasized, it is usually followed by the word "that" (FIG. 11, right-hand side). It suggests that the word "believe" is usually emphasized when followed by a clause.

General Feedback

In general, the present system received positive feedback from our users. They mentioned the system was easy to use and appreciated its effectiveness to explore narration strategies. S1 said, "The visualization of prosodic features makes it easy to discover something special in a speech even when I haven't listened to the speech." E1 further added, "With the help of your system, the chance for me to overlook good samples reduces." However, they also gave us some suggestions. E1 said, "Currently, I have to visit TED.com and find the raw audios to validate my hypothesis about an interesting prosodic pattern identified in this system. It would be better if the system supports playing the audio."

During the case study, S0 commented that the system can not only be used for public speaking training, but also for teaching language speaking for non-native speakers, or even general speech analysis.

The present invention relates to a system for analysis of a narration performance, and particularly, but not exclusively, an interactive visual analytics system for exploring and understanding narration strategies in large-scale speech data. The system displays prosodic features extracted from public speeches in multiple level-of-details. It features a novel scalable focus+context visual design to simultaneously present text and prosodic features. Through in-depth case studies with end users, the effectiveness and usefulness of the system with real world datasets is demonstrated.

In summary, the invention provides one or more of:
An interactive multi-level visual analytics system that helps speakers explore and understand various prosodic patterns in public speech.
A novel and scalable visual design based on the focus+ context technique to display detailed sentence-level prosodic features.
Case studies based on real world dataset to evaluate the effectiveness of the proposed method.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method of processing an audio signal, comprising the steps of:
receiving, via a receiver module, an audio signal;
extracting, via a signal analysis module, prosodic features from the audio signal, the prosodic features are extracted from the audio signal to form a time series with a predefined, selected or calculated sample rate;
aligning, via a signal alignment module, the extracted prosodic features with a script derived from or associated with the audio signal, the script comprises structural blocks of a first type comprising any one or any combination of clauses, phrases or sentences, and each structural blocks of a first type comprises structural blocks of a second type comprising any one or any combination of unigrams, bigrams and trigrams; and labelling each structural block of a second type comprising the script with one or both of a start timestamp and an end timestamp;

segmenting, via a script segmenting module, the script with said aligned extracted prosodic features into the structural blocks of a first type;

determining, via a processor, a distance measure comprising a measure of similarity between a structural block of the first type derived from the script with another structural block of the first type forming part of a speech dataset;

wherein for each of the structural block of the first type derived from the script and the other structural block of the first type forming part of the speech dataset, extracting, via a part-of-speech (POS) tag extractor module, part-of-speech (POS) tags for each of the structural block of a second type comprising said structural block of the first type to form a POS sequence; and calculating, via the processor, the measure of similarity between the POS sequence for the structural block of the first type derived from the script and the POS sequence for the other structural block of the first type forming part of the speech dataset;

wherein the measure of similarity between the POS sequence for the structural block of the first type derived from the script and the POS sequence for the other structural block of the first type forming part of the speech dataset is determined from the equation:

$$CSS(S_1,S_2)=\min \Sigma \|edits(CS_{S_1},CS_{S_2})\|$$

where edits $(CSs_1, CSs_2)$ represents an equation for calculating an edit distance based on $CS_{S1}$ and $CS_{S2}$, with $CS_{S1}$ and $CS_{S2}$ respectively comprising the structural block of the first type derived from the script and the other structural block of the first type forming part of the speech dataset; and where $CSS(S_1,S_2)$ is the calculated measure of similarity;

using the calculated measure of similarity to automatically identify in the speech dataset structural blocks of the first type having a measure of similarity within a predefined, selected or calculated range or margin with respect to the calculated measure of similarity; and displaying, via a visualization module, the structural blocks of the first type identified in the dataset with their prosodic features visually presented in three levels of analysis comprising a speech-level analysis, a sentence-level analysis, and a word-level analysis.

2. The method of claim 1, wherein the audio signal comprises digital audio clip of a human speech or a digital audio clip of a computer synthesized speech generated from a text.

3. The method of claim 1, wherein the edit distance between the POS sequence for the structural block of the first type derived from the script and the POS sequence for the other structural block of the first type is calculated using the Damerau-Levenshtein distance.

4. A system for processing an audio signal, the system comprising:

a receiver module for receiving an audio signal;

a signal analysis module for extracting prosodic features from the audio signal to form a time series with a predefined, selected or calculated sample rate;

a signal alignment module for aligning the extracted prosodic features with a script derived from or associated with the audio signal, the script comprises structural blocks of a first type comprising any one or any combination of clauses, phrases or sentences, and each structural blocks of a first type comprises structural blocks of a second type comprising any one or any combination of unigrams, bigrams and trigrams; each structural block of a second type is labelled with one or both of a start timestamp and an end timestamp;

a script segmenting module for segmenting the script with the extracted prosodic features into the structural blocks of a first type;

a processor for determining a distance measure comprising a measure of similarity between a structural block of the first type derived from the script with another structural block of the first type forming part of a speech dataset; wherein for each of the structural block of the first type derived from the script and the other structural block of the first type forming part of the speech dataset, a part-of-speech (POS) tag extractor module extracts part-of-speech (POS) tags for each of the structural block of a second type comprising said structural block of the first type to form a POS sequence;

wherein the processor calculates the measure of similarity between the POS sequence for the structural block of the first type derived from the script and the POS sequence for the other structural block of the first type forming part of the speech dataset;

wherein the measure of similarity between the POS sequence for the structural block of the first type derived from the script and the POS sequence for the other structural block of the first type forming part of the speech dataset is determined from the equation:

$$CSS(S_1,S_2)=\min \Sigma \|edits(CS_{S_1},CS_{S_2})\|$$

where edits$(CSs_1, CSs_2)$ represents an equation for calculating an edit distance based on $CS_{S1}$ and $CS_{S2}$ with $CS_{S1}$ and $CS_{S2}$ respectively comprising the structural block of the first type derived from the script and the other structural block of the first type forming part of the speech dataset; and where $CSS(S_1,S_2)$ is the calculated measure of similarity;

using the calculated measure of similarity, the processor is adapted to automatically identify in the speech dataset structural blocks of the first type having a measure of similarity within a predefined, selected or calculated range or margin with respect to the calculated measure of similarity; and a visualization module for displaying the structural blocks of the first type identified in the dataset with their prosodic features visually presented in three levels of analysis comprising a speech-level analysis, a sentence-level analysis, and a word-level analysis.

5. A computer implemented method of searching a speech dataset, the method comprising the steps of:

receiving, via a processor, a user input comprising a structural block of a first type from a script; wherein the script comprises structural blocks of a first type comprising any one or any combination of clauses, phrases or sentences, and each structural blocks of a first type comprises structural blocks of a second type comprising any one or any combination of unigrams, bigrams and trigrams;

extracting, via a part-of-speech (POS) tag extractor module, part-of-speech (POS) tags for each structural block of a second type comprising said inputted structural block of the first type to form a POS sequence for said inputted structural block of the first type; and comparing via a data analysis module, said extracted POS sequence for said inputted structural block of the first type with POS sequences for structural blocks of the first type in the speech dataset to thereby identify one or more other structural blocks of the first type in the speech dataset which have a same or similar POS sequence as the inputted structural block of the first type;

wherein the step of comparing said extracted POS sequence for said inputted structural block of the first type with POS sequences for structural blocks of the first type in the speech dataset comprises determining a distance measure comprising a measure of similarity between the POS sequence for the inputted structural block of the first type and the POS sequence for each of the one or more other structural blocks of the first type in the speech dataset, wherein the measure of similarity between the POS sequence for the inputted structural block of the first type and the POS sequence for each of the one or more other structural blocks of the first type in the speech dataset is determined from the equation:

$$CSS(S_1, S_2) = \min \Sigma \|edits(CS_{S_1}, CS_{S_2})\|$$

where $edits(CSs_1, CSs_2)$ represents an equation for calculating an edit distance based on $CS_{S1}$ and $CS_{S2}$ with $CS_{S1}$ and $CS_{S2}$ respectively comprising the inputted structural block of the first type and each of the one or more other structural blocks of the first type in the speech dataset and where $CSS(S_1, S_2)$ is the calculated measure of similarity;

using the calculated measure of similarity to automatically identify in the speech dataset structural blocks of the first type having a measure of similarity within a predefined, selected or calculated range or margin with respect to the calculated measure of similarity; and displaying, via a visualization module, the structural blocks of the first type identified in the dataset with their prosodic features visually presented in three levels of analysis comprising a speech-level analysis, a sentence-level analysis, and a word-level analysis.

6. The method of claim 5, wherein the step of identifying one or more other structural blocks of the first type in the speech dataset which have a same or similar POS as the inputted structural block of the first type identifies their associated scripts or speeches.

7. The method of claim 6, wherein one or more of the identified associated scripts or speeches are made available to a speech replay or speech synthesis module or system to audio play all or part of said associated scripts or speeches to a user.

8. The method of claim 5, wherein the edit distance between the POS sequences for the inputted structural block of the first type and each of the one or more other structural blocks of the first type in the speech dataset is calculated using the Damerau-Levenshtein distance.

* * * * *